March 14, 1939.  V. T. MILWARD  2,150,719
EGG SEPARATOR
Filed Nov. 7, 1938
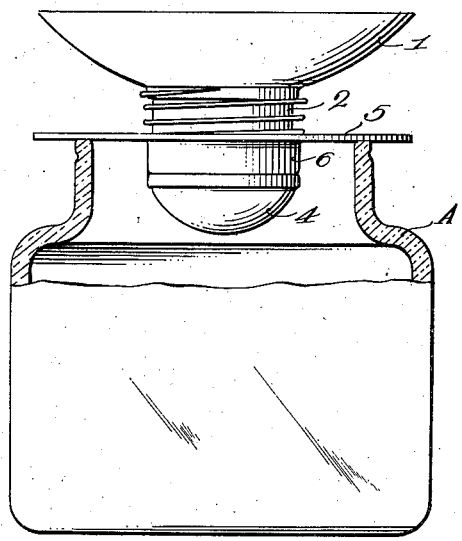
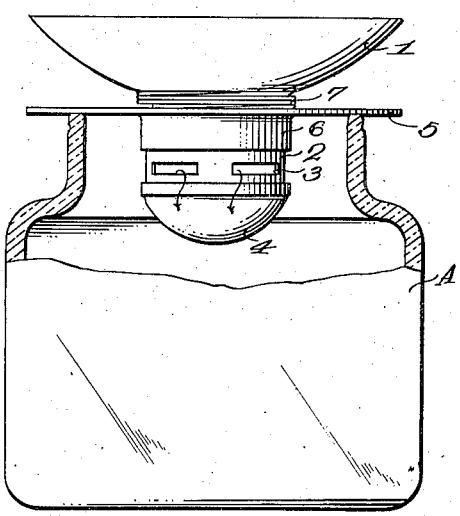
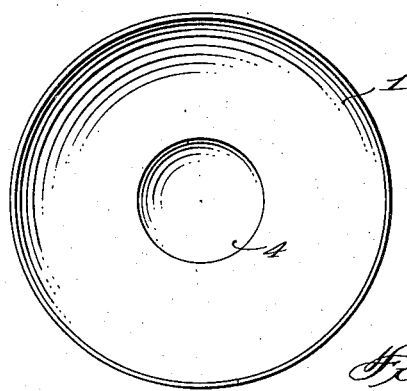
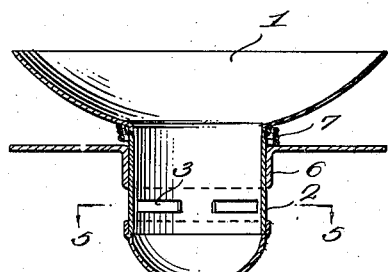
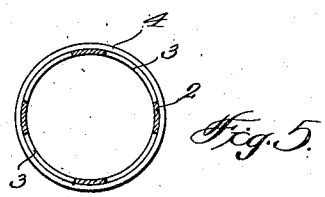
Victor T. Milward
INVENTOR
BY Victor J. Evans & Co.
ATTORNEYS Patented Mar. 14, 1939

2,150,719

UNITED STATES PATENT OFFICE 2,150,719

EGG SEPARATOR

Victor T. Milward, Santa Barbara, Calif.

Application November 7, 1938, Serial No. 239,370

2 Claims. (Cl. 146—2)

This invention relates to egg separators, and its general object is to provide a device that is primarily designed to bring about complete separation of the white of an egg from its yolk with minimum possibility of the yolk becoming broken and commingling with the white, but should it be ascertained that the egg is bad or if the yolk becomes broken after being placed within the device, such can be readily removed therefrom before separation, thus it will be seen that my device eliminates the mixture of a bad egg or broken yolk with whites that have been previously separated, as the egg can be carefully inspected before bringing about the separating function of the device.

Another object is to provide an egg separator that can be supported with respect to a container for receiving the whites therein, and the device is easy to operate and maintained in a clean and sanitary condition.

A further object is to provide an egg separator, that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a view of my device supported upon a container and with the parts thereof in normal or egg receiving position.

Figure 2 is a similar view with the parts of my device in egg separating position.

Figure 3 is a top plan view of the device per se.

Figure 4 is a sectional view taken approximately on line 4—4 of Figure 3.

Figure 5 is a sectional view taken approximately on line 5—5 of Figure 4, looking in the direction of the arrows.

Referring to the drawing in detail, the letter A indicates a container which is shown as being a jar of the usual construction and forms no part of the present invention, in that any type of container may be used for supporting my device and for receiving the egg whites therefrom.

The device includes an initial egg receiving member 1 in the form of a substantially shallow bowl, but it will be understood that the bowl member may be of any suitable depth without departing from the spirit of the invention. The bowl member is provided with a centrally disposed opening having a marginal flange depending therefrom and secured to and depending from the flange is a tubular member 2 provided adjacent its lower end with circumferentially arranged equi-distantly spaced elongated slots 3 that provide outlet means for the white of an egg, as will be apparent.

Detachably mounted on the lower end of the tubular member 2 and preferably frictionally secured thereto is the flanged upper end of a cup-shaped member 4 that provides a settling chamber for the yolk, it being understood that the yolk is heavier than the white and therefore will settle within the cup-shaped member for disposal below the slots 3, as will be apparent upon inspection of Figure 4.

Surrounding the tubular member 2 is a disk shaped member 5 having a centrally disposed opening therein and depending from the opening is an annular flange 6 formed on the disk shaped member 5 and mounted for slidable movement on the tubular member to provide valve means for covering and uncovering the slots so as to control the same, as will be apparent.

Sleeved about the tubular member between the bowl member and the disk shaped member is a coil spring 7 that normally retains the flange or valve member in position for closing the slots, as shown in Figure 1.

In the use of my device, it is believed that it will be obvious that it is primarily designed to be supported upon the neck of a container or the like, as shown in Figures 1 and 2, with the disk shaped member resting on the neck, so that the tube together with the cup shaped member extends within the container. When so arranged, an egg is broken and the contents of the shell is deposited within the device, thence pressure is applied to the bowl member for disposing the slots 3 below the valve means or flange 6, as shown in Figure 2. The device is held in that position until the white of the egg is passed through the slots, as will be apparent. When the white of the egg has been completely separated from the yolk the pressure is released for disposing the parts to their normal position of Figure 1, and the yolk is then removed merely by tilting the device for that purpose.

From the above description and disclosure of the drawing, it is believed that it will be obvious that as the slots 3 are normally closed, that after an egg is broken and deposited within the device, it can be carefully inspected to ascertain its condition, before operating the device to its separating position, with the result it will be seen that a bad egg or one that has a broken yolk can be discarded, and therefore will not become mixed with previously separated egg whites within the container.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A device for separating the white of an egg from its yolk and comprising a bowl member, tubular means secured to and depending from the bowl member and having circumferentially arranged equi-distantly spaced outlet slots therein for the passage of the egg white therethrough, a cup-shaped member detachably secured to the lower end of the tubular means and providing a yolk receiving chamber, disk shaped means for supporting the device upon a container for receiving the egg white from the device and including an annular flange providing a valve surrounding the tubular means for slidable movement of the latter therethrough for controlling the slots, and a spring between the disk shaped means and bowl member for normally holding the parts in a position with the flange closing the slots.

2. A device for separating the white of an egg from its yolk and comprising a substantially shallow bowl member, a tubular member secured to and depending centrally from the bowl member and having circumferentially arranged equi-distantly spaced outlet slots therein adjacent its lower end for passage of the egg white therethrough, means removably associated with the lower end of the tubular member and providing a yolk settling chamber, a disk shaped member for supporting the device upon a container for receiving the egg white from the device, an annular flange formed on and depending centrally from the disk shaped member and providing a valve surrounding the tubular member for slidable movement of the latter therethrough for controlling the slots, and a coil spring sleeved about the tubular member between the disk shaped member and the bowl member for normally holding the parts elevated with the flange closing the slots and whereby when downward pressure is applied to the bowl member against the action of the spring the slots will be uncovered for the passage of the egg white therethrough.

VICTOR T. MILWARD.